3,519,679
Patented July 7, 1970

3,519,679
SULFONATE SALTS OF 4-DIMETHYLAMINO-3,5-XYLYL METHYLCARBAMATE
Jeptha W. Van Valkenburg, Jr., Midland, Mich., assignor to The Dow Chemical Company, Midland, Mich., a corporation of Delaware
No Drawing. Filed July 31, 1967, Ser. No. 657,061
Int. Cl. C07f 11/00; A01n 9/14
U.S. Cl. 260—479                                    8 Claims

ABSTRACT OF THE DISCLOSURE

Novel salts of 4-dimethylamino-3,5-xylyl methylcarbamate with acids containing oxygen in the anionic moiety thereof and having a pK (negative log of dissociation constant) not greater than 2.12. The novel salts are useful as pesticides primarily for the control of insects. The neutral salts and the acid salts with acids having a $pK_2$ greater than 2.12 are more stable to ultraviolet radiation than the free base. Certain of the salts are less phytotoxic than the free base and more potent as systemic insecticides than the free base.

BACKGROUND OF THE INVENTION

The compounds of this invention are oxygen-containing salts of 4-dimethylamino-3,5-xylyl methylcarbamate, described by Shulgin in U.S. Pats. Nos. 3,060,225 and 3,084,098.

The free base 4-dimethylamino-3,5-xylyl methylcarbamate is susceptible to photodegradation by ultraviolet light. Kenaga et al., J. Econ. Ent. 55, 466 (1962). The compound and its hydrohalide acid addition salts are also slightly toxic to certain plant species. The phytotoxicity of the free base and hydrohalides makes it necessary to apply the compounds at controlled low dosages when the compounds are used as insecticides for the control of insect species attacking said plant species. The free base is useful as a systemic insecticide; however, it has been found to be most effective only at dosages which are close to the toxic dose for the animal treated.

SUMMARY OF THE INVENTION

This invention is directed to salts of 4-dimethylamino-3,5-xylyl methylcarbamate with acids containing oxygen atoms in the anionic moiety thereof and having a pK (negative log of dissociation constant) no greater than 2.12. The novel salts of the invention are crystalline solids which are soluble in water and of varying degrees of solubility in various organic solvents such as acetone, alcohols and chlorinated hydrocarbons.

The novel salts are extremely effective as pesticides for the control of insects, aphids, mites and other pests. The neutral salts of the invention and the acid salts of 4-dimethylamino-3,5-xylyl methylcarbamate with acids having a $pK_2$ (negative log of dissociation constant for ionization of the second available hydrogen of a polybasic acid) greater than 2.12 have unexpectedly greater stability to ultraviolet irradiation than the free base. The salts with acids selected from the group of acids containing only various combinations of atoms selected from the group consisting of hydrogen, carbon, nitrogen, phosphorus, oxygen and sulfur in the anionic moiety have no substantial phytotoxicity. Representative salts which are relatively harmless to plants include the sulfate, nitrate, phosphate, oxalate and organic sulfonate salts. It has also been found that the novel salts of the invention and, in particular, the organic sulfonic acid salts, are much more effective than the free base 4-dimethylamino-3,5-xylyl methylcarbamate as systemic insecticides, thus permitting the effective use of the compounds at dosages substantially below the toxic dosages.

The salts of the invention are conveniently prepared by the reaction of 4-dimethylamino-3,5-xylyl methylcarbamate with an oxygen-containing acid having a pK no greater than 2.12. In a convenient procedure, the free base is dissolved in acetone and an equimolar proportion of acid is mixed well with the solution. The reaction takes place readily at temperatures from 0° to 50° C. and is conveniently carried out at room temperature. The reaction time varies depending upon the dissociation constant of the acid employed, the reaction being almost instantaneous when acids having a low pK are employed and requiring a longer reaction period when the pK of the acid is close to 2.12. The salt precipitates in the reaction mixture and can be conveniently separated by conventional procedures such as filtration, centrifugation and the like. The salt can be purified by conventional methods such as recrystallization and washing.

In a convenient procedure, 4-dimethylamino-3,5-xylyl methylcarbamate is dissolved in acetone and the acid is added with stirring to the solution. When a dibasic acid is employed, two molar proportions of the free base are employed for each molar proportion of the acid when it is desired to prepare a neutral salt. When it is desired to prepare the acid salts of polybasic acids, equimolar proportions of the free base and the acid are employed. Generally, polybasic acids having a $pK_2$ greater than 2.12 will form only acid salts with 4-dimethylamino-3,5-xylyl methylcarbamate and the neutral salt cannot be prepared even when using an excess of the free base.

The salts of the invention are employed as pesticides for the control of insects, mites, aquatic pests, trash fish and the like. For such operations, the novel salts are conveniently formulated in carriers and applied to the pest organisms, their habitats or their food by conventional procedures such as spraying, dipping, dusting, etc. The salts can be modified with one or more of a plurality of adjuvants including aromatic solvents, petroleum distillates, water-liquid carriers and finely divided inert solids. Augmented compositions can be prepared which are adapted to be employed for the control of undesirable parasites or employed as concentrates and subsequently diluted with additional inert carriers to produce ultimate treating compositions. In the compositions to be employed as concentrates, the novel salts can be present in a concentration from about 1 to 50 percent by weight.

In the preferred compositions, one or more of the novel salts of the invention are mixed together with a non-ionic emulsifier and with sufficient of an acidic substance to provide a final treating composition having a pH between 4 and 8. The acidic substance to be employed is one which has no phytotoxic effects at the concentrations employed in the ultimate treating compositions and which is compatible with the components of the mixture. Suitable acidic substances which can be employed include citric acid, malic acid, oxalic acid, fumaric acid and the acid employed in the production of the novel salt employed. The preferred emulsifiers are alkali metal and alkaline earth metal salts of alkylbenzene sulfonic acids. Such compositions have been found to be particularly resistant to photodegradation by ultraviolet light and thus to possess outstanding residual pesticidal activity.

DESCRIPTION OF PREFERRED EMBODIMENTS

The following examples are illustrative of the invention but are not to be construed as limiting the same.

EXAMPLE 1

0.1 mole of 4-dimethylamino-3,5-xylyl methylcarbamate is dissolved in acetone and 0.1 mole of nitric acid is added to the solution with stirring. The precipitate which forms is separated by filtering the mixture. The 4-dimethylamino - 3,5 - xylyl methylcarbamate nitrate product is washed with acetone, dried and found to melt at 191°–193° C.

In substantially the same procedure, the following salts are prepared:

4 - dimethylamino - 3,5 - xylyl methylcarbamate sulfate, melting at 192°–193° C., is prepared by mixing together two molar proportions of 4-dimethylamino-3,5-xylyl methylcarbamate and one molar proportion of sulfuric acid.

4 - dimethylamino - 3,5-xylyl methylcarbamate acid phosphate, melting at 145°–150° C., is prepared by mixing together one molar proportion of 4-dimethylamino-3,5-xylyl methylcarbamate and one molar proportion of phosphoric acid.

4 - dimethylamino - 3,5 - xylyl methylcarbamate m-benzenedisulfonate, melting at 242°–244° C., is prepared by mixing together two molar proportions of 4-dimethylamino-3,5-xylyl methylcarbamate and one molar proportion of m-benzenedisulfonic acid.

4 - dimethylamino - 3,5 - xylyl methylcarbamate dodecylbenzene sulfonate, melting at 162°–164° C., is prepared by mixing together one molar proportion of 4-dimethylamino-3,5-xylyl methylcarbamate and one molar proportion of dodecylbenzene sulfonic acid.

4 - dimethylamino-3,5 - xylyl methylcarbamate acid oxalate, melting at 137° C., is prepared by mixing together one molar proportion of 4-dimethylamino-3,5-xylyl methylcarbamate and one molar proportion of oxalic acid.

4 - dimethylamino - 3,5 - xylyl methylcarbamate p-toluenesulfonate, melting at 157°–160° C., is prepared by mixing together one molar proportion of 4-dimethylamino-3,5-xylyl methylcarbamate and one molar proportion of p-toluenesulfonic acid.

EXAMPLE 2

Several separate seed beds were prepared with soil of good nutrient content. Tomato plants were grown to an average height of about 4 inches in each of the seed beds. In order to evaluate the phytotoxicity of the salts of the invention, separate tomato plants in separate seed beds were sprayed to run-off with a liquid composition containing a representative salt of the invention at a concentration of 4000 parts per million by weight. For comparison, other similar tomato plants in a similar seed bed were sprayed to run-off with a similar composition containing 4000 parts per million by weight of 4-dimethylamino-3,5-xylyl methyl carbamate hydrochloride. The plants were then held in a greenhouse for two weeks after which the plants were examined for kill or foliage injury. A separate seed bed containing tomato plants was similarly held to serve as a check but this check seed bed was not treated with any carbamate compound or salt thereof. At the end of the observation period, the tomato plants treated with 4-dimethylamino-3,5-xylyl methylcarbamate hydrochloride were found to be alive; however, 30 percent of these plants showed foliage injury characteristic of chemical burning. The plants treated with salts of 4-dimethylamino-3,5-xylyl methylcarbamate with phosphoric acid, dodecylbenzene sulfonic acid, methane sulfonic acid, sulfoacetic acid, benzene sulfonic acid, phenol sulfonic acid, 4-sulfosalicylic acid, p-toluene sulfonic acid, 2-naphthalene sulfonic acid, 10-camphor sulfonic acid and m-benzenedisulfonic acid were found to be similar in every respect to the untreated plants in the check seed bed.

EXAMPLE 3

A series of separate seed beds was planted with corn and the corn plants were grown to an everage height of about 4 inches. A separate series of separate seed beds was planted with pinto beans and the bean plants were grown to a height of about 4 inches. The plants in separate seed beds of each series were then sprayed to run-off with separate liquid compositions each containing a representative salt of the invention at a concentration of 4000 parts per million. For comparison, a separate seed bed of corn and a separate seed bed of beans were sprayed to run-off with a liquid composition containing 4000 parts per million of 4-dimethylamino-3,5-xylyl methylcarbamate hydrochloride. The treated seed beds were held in a greenhouse for two weeks. A separate pair of seed beds, one planted with corn and one with beans, were similarly prepared and held in a greenhouse, but these check seed beds were not treated with any carbamate compound or salt thereof. At the end of the test period, 20 percent of the corn plants treated with 4-dimethylamino-3,5-xylyl methylcarbamate hydrochloride were found to be killed and 95 percent of the bean plants showed reduced or stunted growth as compared with the bean plants of the check seed bed. The plants in the seed beds of corn and beans contacted with the nitrate, sulfate, phosphate, oxalate, dodecylbenzene sulfonate, methane sulfonate, sulfoacetate, benzene sulfonate, phenol sulfonate, 4-sulfosalicylate, p-toluene sulfonate, 2-naphthalene sulfonate, 10-camphor sulfonate and m-benzenedisulfonate salts of 4-dimethylamino-3,5-xylyl methylcarbamate appeared similar in every respect to those growing in the check seed beds.

EXAMPLE 4

Stability to ultraviolet radiation was evaluated by the following procedure. A solution of 4-dimethylamino-3,5-xylyl methylcarbamate or a salt thereof was employed to coat a roughened sheet of glass with the equivalent of 24.4 milligrams of the free base. A VanWaters and Rogers Catalog No. 36554 Multi-Ray Laboratory Lamp fitted with a short-wave ultraviolet light source was used to irradiate the glass plates. The glass plates were placed face upwards under the ultraviolet lamp and the lamp reflector was lowered so that its margin was within about 2 millimeters of the plate. The plates were exposed for various periods of time after which the toxicant compound was washed from the plate with methanol and diluted to a volume of 5 milliliters with methanol. The color of the methanol solutions was determined with a Klett colorimeter using the percent transmission of light having a wave length of 410–480 millimicrons. The readings obtained were used to calculate percent degradation on the basis of a reading of 700 for complete degradation of 4-dimethylamino-3,5-xylyl methylcarbamate.

In such operations, a standard formulation of 4-dimethylamino-3,5-xylyl methylcarbamate was compared to 4-dimethylamino-3,5-xylyl methylcarbamate acid oxalate over a period of 100 hours. After about ten hours irradiation, the free base formulation was found to have lost about 50 percent of the toxicant initially present while the oxalate salt retained at least 50 percent of its effectiveness until after about 35 hours. To check the assay method described above, the methanol solutions of the irradiated compositions were applied to larvae of the cabbage looper by the application of one microliter to the anterior dorsal third of each larvae. The treated larvae were placed in shell vials containing about 3 milliliters of insect diet and the larvae were held for 48 to 72 hours, after which the number of deaths was recorded. In these operations, the free base formulation was found to have lost 50 percent of its effectiveness after about 10 hours and the oxalate salt was found to retain at least 50 percent of its effectiveness for about 35 hours. After 100 hours, the free base formulation was found to retain only 22 percent of the original toxicant while the 4-dimethylamino-3,5-xylyl methylcarbamate acid oxalate was found to retain about 42 percent of the initial toxicant.

EXAMPLE 5

In similar operations, roughened glass slides were coated with methanol solutions containing either the free base or a salt of 4-dimethylamino-3,5-xylyl methylcarbamate and subjected to ultraviolet radiation in the manner described in Example 4. The percent of original toxicant remaining was determined colorimetrically after 12 and after 24 hours of irradiation by the method described above in Example 4. In these operations, two representative neutral salts of the invention, the nitrate and the dodecylbenzene sulfonate, were employed. For purposes of comparison, an acid salt of an acid having a $pK_2$ less than 2.12, the bisulfate, and an acid salt of an acid having a $pK_2$ greater than 2.12, the oxalate, were also compared. The compounds tested and the percent of original toxicant remaining after irradiation are set out in Table I.

TABLE I

| Compound | Percent of original toxicant remaining after irradiation | |
|---|---|---|
| | 12 hours | 24 hours |
| Free base | 45 | 40 |
| Bisulfate | 50 | 41 |
| Nitrate | 85 | 82 |
| Dodecylbenzene sulfonate | 85 | 83 |
| Oxalate | 73 | 62 |

EXAMPLE 6

Representative salts of the invention were administered orally to sheep in gelatin capsules at a dosage rate of 25 milligrams per kilogram. Three hours after administration of the test compound, blood was withdrawn from each of the treated animals and starved stable flies were allowed to feed on the blood. The stable flies were examined 24 hours after feeding on the treated blood samples to determine the percent mortality. For purposes of comparison, a separate sheep was administered 25 milligrams per kilogram of the free base 4-dimethylamino-3,5-xylyl methylcarbamate, blood samples were similarly prepared from the sheep and mortality counts made on stable flies. The percent mortality of stable flies feeding on the blood samples obtained from animals administered a particular compound are set out in Table II.

TABLE II

| Compound: | Percent mortality of stable flies |
|---|---|
| Free base | 0 |
| Benzene sulfonate | 100 |
| m-Benzenedisulfonate | 100 |
| 10-camphor sulfonate | 100 |
| Methane sulfonate | 100 |
| 2-naphthalene sulfonate | 100 |
| Phenol sulfonate | 100 |
| Sulfoacetate | 80 |
| 4-sulfosalicylate | 80 |
| p-Toluene sulfonate | 100 |

In similar operations, substantially complete kills of stable flies were obtained when separate sheep were administered one of the m-benzenedisulfonic acid, 10-camphor sulfonic acid, p-toluene sulfonic acid and sulfoacetic acid salts of 4-dimethylamino-3,5-xylyl methylcarbamate, the compounds being administered orally at a dosage rate of 12.5 milligrams per kilogram.

What is claimed is:

1. A salt of 4-dimethylamino-3,5-xylyl methylcarbamate with an acid containing an oxygen atom in the anionic moiety thereof, said acid being an organic sulfonic acid having a pK not greater than 2.12, said salt being selected from the group consisting of the dodecylbenzene sulfonate, methane sulfonate, sulfoacetate, benzene sulfonate, phenol sulfonate, 4-sulfosalicylate, p-toluene sulfonate, 2-naphthalene sulfonate, 10-camphor sulfonate and m-benezene disulfonate salts.

2. The salt of claim 1 wherein the anionic moiety of the acid contains only atoms selected from the group consisting of carbon, hydrogen, nitrogen, phosphorus, oxygen and sulfur.

3. The salt of claim 1 wherein the salt is a neutral salt.

4. A salt of claim 1 wherein the salt is an acid salt with an acid having a $pK_2$ greater than 2.12.

5. The salt of claim 1 wherein the salt is the benzene sulfonate salt.

6. The salt of claim 1 wherein the salt is the phenol sulfonate salt.

7. The salt of claim 1 wherein the salt is the 2-naphthalene sulfonate salt.

8. The salt of claim 1 wherein the salt is the 4-sulfosalicylate salt.

References Cited

UNITED STATES PATENTS 3,060,225   10/1962   Shulgin _____ 260—479

JAMES A. PATTEN, Primary Examiner

U.S. Cl. X.R.

424—199, 300